United States Patent
Umesato et al.

(10) Patent No.: US 11,549,027 B2
(45) Date of Patent: Jan. 10, 2023

(54) AQUEOUS INK, INK CARTRIDGE, INK JET RECORDING METHOD AND METHOD FOR PRODUCING AQUEOUS INK

(71) Applicant: CANON KABUSHIKI KAISHA, Tokyo (JP)

(72) Inventors: Toshiyuki Umesato, Kanagawa (JP); Naofumi Shimomura, Kanagawa (JP); Katsuhiro Hayashi, Kanagawa (JP); Tsuyoshi Kasai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/203,141

(22) Filed: Mar. 16, 2021

(65) Prior Publication Data
US 2021/0206984 A1  Jul. 8, 2021

Related U.S. Application Data

(63) Continuation of application No. PCT/JP2019/036883, filed on Sep. 20, 2019.

(30) Foreign Application Priority Data

Sep. 20, 2018  (JP) .............................. JP2018-175721

(51) Int. Cl.
| | |
|---|---|
| *C09D 11/104* | (2014.01) |
| *B41J 2/175* | (2006.01) |
| *B41M 5/00* | (2006.01) |
| *C08G 63/183* | (2006.01) |
| *C09D 11/322* | (2014.01) |

(52) U.S. Cl.
CPC ......... *C09D 11/104* (2013.01); *B41J 2/17503* (2013.01); *B41M 5/0023* (2013.01); *C08G 63/183* (2013.01); *C09D 11/322* (2013.01)

(58) Field of Classification Search
CPC ........ B41J 2/01; C09D 11/104; C09D 11/322; C09D 11/30; C09D 167/00; C08G 63/183
See application file for complete search history.

(56) References Cited

U.S. PATENT DOCUMENTS

| | | | | |
|---|---|---|---|---|
| 2002/0061959 | A1* | 5/2002 | Kajimaru ............. | C09D 167/00 524/601 |
| 2013/0266797 | A1* | 10/2013 | Teramoto ............. | C08J 9/00 521/149 |
| 2017/0335124 | A1* | 11/2017 | Hayashi ............... | C09D 11/38 |

(Continued)

FOREIGN PATENT DOCUMENTS

| | | |
|---|---|---|
| JP | 08259871 A | 10/1996 |
| JP | 09263684 A | 10/1997 |

(Continued)

*Primary Examiner* — John Zimmermann
(74) *Attorney, Agent, or Firm* — Canon U.S.A., Inc., IP Division (57) ABSTRACT

To provide an aqueous ink having excellent storage stability and capable of recording an image having excellent abrasion resistance and the like. An aqueous ink for ink jet containing a resin particle, in which the resin particle is formed of a polyester resin having a carboxylic acid group, and an amount of carboxylic acid groups present on particle surfaces of the resin particle is 0.3 times or more to 0.8 times or less in terms of molar ratio with respect to all of the carboxylic acid groups in the polyester resin having the carboxylic acid group.

17 Claims, 2 Drawing Sheets

(56) References Cited

U.S. PATENT DOCUMENTS

| | | | |
|---|---|---|---|
| 2019/0168182 A1* | 6/2019 | Sato | C09D 11/102 |
| 2020/0190344 A1* | 6/2020 | Koyama | B41M 5/0023 |
| 2021/0198504 A1* | 7/2021 | Umesato | C09D 167/00 |
| 2021/0292577 A1* | 9/2021 | Hayashi | B41J 2/17503 |

FOREIGN PATENT DOCUMENTS

| | | | |
|---|---|---|---|
| JP | 2000007963 A | | 1/2000 |
| JP | 2002220477 A | | 8/2002 |
| JP | 2003327862 A | | 11/2003 |
| JP | 2007277495 A | | 10/2007 |
| JP | 2010018774 A | | 1/2010 |
| JP | 2011084673 A | | 4/2011 |
| JP | 2015502996 A | | 1/2015 |
| JP | 2015086393 A | | 5/2015 |
| JP | 2015143326 A | | 8/2015 |
| JP | 2016027078 A | | 2/2016 |
| JP | 2017226834 A | | 12/2017 |

\* cited by examiner

AQUEOUS INK, INK CARTRIDGE, INK JET RECORDING METHOD AND METHOD FOR PRODUCING AQUEOUS INK

CROSS-REFERENCE TO RELATED APPLICATIONS

This application is a Continuation of International Patent Application No. PCT/JP2019/036883, filed Sep. 20, 2019, which claims the benefit of Japanese Patent Application No. 2018-175721, filed Sep. 20, 2018, both of which are hereby incorporated by reference herein in their entirety.

BACKGROUND OF THE INVENTION

Field of the Invention

The present invention relates to an aqueous ink, an ink cartridge, an ink jet recording method and a method for producing an aqueous ink.

Description of the Related Art

In the related art, an ink jet recording apparatus has been widely used as a small printer for home use, but in recent years, the application thereof has been expanded to use in offices, commercial printing, and the like. In these fields, it is required to record an image having higher abrasion resistance than the level required for home use and the like. An aqueous ink containing a resin particle formed of polyester resin has been investigated to improve the abrasion resistance of an image (refer to Japanese Patent Application Laid-Open No. 2017-226834).

When the present inventors recorded an image using the aqueous ink described in Japanese Patent Application Laid-Open No. 2017-226834, it was found that the abrasion resistance was good, but the storage stability of the ink was not sufficient.

Therefore, an object of the present invention is to provide an aqueous ink having excellent storage stability and capable of recording an image having excellent abrasion resistance and a method for preparing the aqueous ink. Another object of the present invention is to provide an ink cartridge using the aqueous ink and an ink jet recording method.

SUMMARY OF THE INVENTION

The above objects are achieved by the following inventions. That is, an aqueous ink according to an aspect of the present invention is an aqueous ink for ink jet including a resin particle, in which the resin particle is formed of a polyester resin having a carboxylic acid group, and an amount of carboxylic acid groups present on a particle surface of the resin particle is 0.3 times or more to 0.8 times or less in terms of molar ratio with respect to all of the carboxylic acid groups of the polyester resin having the carboxylic acid group.

Further features of the present invention will become apparent from the following description of exemplary embodiments with reference to the attached drawings.

DESCRIPTION OF THE EMBODIMENTS

The present invention will be described in more detail below with reference to preferred exemplary embodiments. In the present invention, in a case where the compound is a salt, the salt is present in a state dissociated into ions in an ink, which is, however, expressed as "salt is contained" for convenience according to the present invention. Further, an aqueous ink for ink jet may be simply referred to as "ink" in some cases. Unless otherwise specified, the physical property values are values at normal temperature (25° C.), normal pressure (1 atm=101325 Pa) and normal humidity (relative humidity: 50%). In addition, the "unit" means a unit structure corresponding to one monomer, unless otherwise specified. In a case where "(meth)acrylic acid" and "(meth)acrylate" are described, "(meth)acrylic acid" and "(meth)acrylate" respectively indicate "acrylic acid and methacrylic acid" and "acrylate and methacrylate".

A polyester resin includes a unit derived from a polyhydric alcohol and a unit derived from a polyvalent organic acid. A general purpose polyester resin includes a unit derived from a polyhydric alcohol and a unit derived from a polycarboxylic acid. A structure containing an ester bond (—COO—) including a unit derived from a polyhydric alcohol and a unit derived from a polycarboxylic acid may be referred to as an "ester unit".

An oxygen atom constituting a carbonyl group of the ester bond is polarized in $\delta^-$. In addition, since a general recording medium used in an ink jet recording method is neutral to acidic, a hydrogen atom polarized in $\delta^+$ is present. When an ink containing a resin particle formed of a polyester resin is applied to a recording medium, the oxygen atom polarized in $\delta^-$ of the polyester resin and the hydrogen atom polarized in $\delta^+$ of the recording medium are attracted to each other. Thus, the recording medium and the resin particle formed of the polyester resin are easily closely attached to each other. In addition, the polyester resin having a carboxylic acid group is brought into a state in which the molecular chains of the polyester resin are entangled by hydrogen bonds generated between plural carboxylic acid groups in a recording medium. As described above, the abrasion resistance of an image is exhibited by the adhesiveness between the recording medium and the polyester resin and the entanglement of the molecular chains of the polyester resin.

The present inventors have investigated that a carboxylic acid group is incorporated into a polyester resin in order to improve the storage stability of an ink by keeping the dispersion state of the resin particle formed of the polyester resin stable. Since the resin particle formed of the polyester resin having a carboxylic acid group is present in the aqueous ink in a state in which at least part of the carboxylic acid groups are present on the particle surfaces thereof, it is expected that the dispersion state of the resin particle in the ink is stable due to the hydrophilicity of the carboxylic acid group.

However, as a result of the investigation, it has been found that even when the polyester resin having a carboxylic acid group is used, the storage stability of the ink may not be improved in some cases. As a result of conducting further investigations by the present inventors, it has been found that when an amount of the carboxylic acid groups present on the particle surface of the resin particle is 0.3 times or more to 0.8 times or less in terms of molar ratio with respect to all of the carboxylic acid groups of the polyester resin, the storage stability can be improved.

When the amount of the carboxylic acid groups present on the particle surface of the resin particle is less than 0.3 times in terms of molar ratio with respect to all of the carboxylic acid groups of the polyester resin, the storage stability is not sufficient. This is because there are a large number of carboxylic acid groups present inside the resin particle, cohesiveness due to hydrogen bonds between the polyester resin particles is excessively increased, and the hydrogen bonds also act between the resin particles in the ink, so that the resin particles are easily aggregated. On the other hand, even when the amount of the carboxylic acid groups present on the particle surface of the resin particle is more than 0.8 in terms of molar ratio with respect to all of the carboxylic acid groups of the polyester resin, the storage stability is not sufficient. This is due to the following reasons. There are few carboxylic acid groups present inside the resin particle, the cohesiveness for maintaining the shape of the particles is weak, and the amount of carboxylic acid groups present on the particle surface of the resin particle is large, so that high hydrophilicity is obtained. This is because while the ink is stored, the polyester resin forming the resin particle is gradually dissolved in the aqueous ink, and the viscosity of the ink is easily increased.

As described above, in the present invention, it is important to obtain a balance between the cohesiveness due to hydrogen bonds of the carboxylic acid groups and the hydrophilicity of the carboxylic acid groups by allowing only a part of the carboxylic acid groups of the resin particle to be present on the particle surface. Thus, the storage stability of the ink can be improved while using the resin particle formed of the polyester resin for exhibiting the abrasion resistance of an image.

<Ink>

The ink of the present invention is an aqueous ink for ink jet that contains a resin particle (hereinafter, may be simply referred to as "resin particle") formed of a polyester resin having a carboxylic acid group. Hereinafter, components constituting the ink of the present invention and physical properties of the ink will be described in detail.

(Resin Particle)

The ink contains a resin particle that is formed of a polyester resin having a carboxylic acid group and an amount of carboxylic acid groups present on the particle surface is 0.3 times or more to 0.8 times or less in terms of molar ratio with respect to all of the carboxylic acid groups. The content (% by mass) of the resin particle in the ink is preferably 0.1% by mass or more to 15.0% by mass or less and more preferably 1.0% by mass or more to 10.0% by mass or less based on the total mass of the ink. The resin particle is dispersed in the ink, that is, the resin particle is present in the ink in the form of a resin emulsion. The resin particle may not contain a coloring material. The proportion (% by mass) of the polyester resin in the resin forming the resin particle is preferably 90% by mass or more and more preferably 100% by mass based on the total mass of the resin. That is, the resin particle formed only of polyester resin are particularly preferable.

In the present invention, the term "resin particle" refers to a resin that is present in a state in which the resin particle is not dissolved in an aqueous medium constituting the ink and specifically, a resin that can be present in an aqueous medium in a state in which particles whose particle diameter can be measured by a dynamic light scattering method are formed. On the other hand, the "water-soluble resin" refers to a resin that is present in a state of being dissolved in an aqueous medium constituting the ink and specifically, a resin that can be present in an aqueous medium in a state in which particles whose particle diameter can be measured by a dynamic light scattering method are not formed. When the resin particle is expressed as a pair of the "water-soluble resin", the resin is "water-dispersible resin (water-insoluble resin)".

Whether or not a certain resin falls under the above-defined "resin particle" can be determined according to the method shown below. First, a liquid containing a resin to be determined (resin content: 10% by mass) is prepared. Next, this liquid is diluted 10-fold (on the volume basis) with pure water to prepare a sample. Then, in a case where the particle diameter of the resin in the sample is measured by a dynamic light scattering method, when particles having a particle diameter are measured, the resin is determined to be the "resin particle" (that is, "water-dispersible resin"). On the other hand, when particles having a particle diameter are not measured, it is determined that the resin is not "resin particle" (that is, "water-soluble resin"). In this case, the measurement can be performed under the conditions of, for example, a SetZero of 30 seconds, a number of measurements of 3 times, a measurement time of 180 seconds, a shape of real spherical shape and a refractive index of 1.59. As the particle size distribution measuring apparatus, a particle diameter analyzer (for example, trade name "UPA-EX150", manufactured by Nikkiso Co., Ltd.) by a dynamic light scattering method or the like can be used. Of course, the particle diameter analyzer and the measurement conditions are not limited thereto.

In the present invention, regarding another resin, such as a resin dispersant, which can be used in addition to the resin particle formed of the polyester resin, whether or not the resin is the resin particle is also determined in the same manner as described above. Regarding the other resin, whether the other resin is the resin particle or a water-soluble resin can be determined by the same manner as described above. However, in order to make a simple determination, it is preferable to determine the other resin using a liquid containing a resin (resin content: 10% by mass) that is neutralized with an alkali (such as sodium hydroxide and potassium hydroxide) in an amount corresponding to the acid value.

[Constituent Material of Resin Particle: Polyester Resin]

The polyester resin that forms the resin particle has a carboxylic acid group. That is, the polyester resin has a unit having a carboxylic acid group. Usually, an unreacted hydroxy group or carboxylic acid group is present at the terminal of the polyester resin. In a case where the carboxylic acid group is not present at the terminal of the polyester resin, the carboxylic acid group is present at a portion other than the terminal. In the present invention, the abrasion resistance of an image can be improved by using the interaction between the $\delta^-$-polarized oxygen atom of the polyester resin and the $\delta^+$-polarized hydrogen atom of the recording medium.

[Polyhydric Alcohol]

Examples of the polyhydric alcohol that becomes a unit derived from the polyhydric alcohol and constitutes the polyester resin by reaction include polyhydric alcohols of divalent to tetravalent. Examples of the structure of the polyhydric alcohol include polyhydric alcohols having an aliphatic group, polyhydric alcohols having an aromatic group and sugar alcohols. Specific examples of the polyhydric alcohol include dihydric alcohols such as ethylene glycol [1,2-ethanediol], neopentyl glycol [2,2-dimethyl-1,3-propanediol], 1,3-propanediol, 1,4-butanediol, benzenediol and 2,2-bis(4-hydroxyphenyl)propane [bisphenol A]; trihydric alcohols such as glycerin, trimethylolethane and trimethylolpropane; and tetrahydric alcohols such as pentaerythritol. In addition, as the polyhydric alcohol, an oligomer (a low molecular weight polymer having a molecular weight of 1,000 or less) can also be used.

Since the weight average molecular weight of the polyester resin is easily adjusted, it is preferable to use polyhydric alcohols of divalent or trivalent. From the viewpoint of the structure, it is preferable to use polyhydric alcohols having an aliphatic group and polyhydric alcohols having an aromatic group. As the polyhydric alcohol having an aliphatic group, a linear or branched polyhydric alcohol having an aliphatic group having 1 to 6 carbon atoms is more preferable. Particularly, it is preferable to use ethylene glycol, neopentyl glycol, bisphenol A and glycerin and it is also preferable to use two or more of these in combination. In a case where polyhydric alcohols having an aliphatic group is used, it is preferable to use the polyhydric alcohols as follows. That is, the proportion of the unit derived from the "linear or branched polyhydric alcohol having an aliphatic group having 1 to 6 carbon atoms" in the units derived from the polyhydric alcohols having an aliphatic group in the polyester resin is preferably 70% by mole or more. The proportion is more preferably 100% by mole.

[Polycarboxylic Acid]

Examples of the polycarboxylic acid that becomes a unit derived from the polycarboxylic acid and constitutes the polyester resin by reaction include polycarboxylic acids of divalent to tetravalent. Examples of the structure of the polycarboxylic acid include polycarboxylic acids having an aliphatic group, polycarboxylic acids having an aromatic group and nitrogen-containing polycarboxylic acids. Specific examples of the polycarboxylic acid include divalent carboxylic acids such as glutaric acid, adipic acid, terephthalic acid, isophthalic acid and 2,6-naphthalenedicarboxylic acid; trivalent carboxylic acids such as trimellitic acid; and tetravalent carboxylic acids such as ethylenediaminetetraacetic acid. In addition, as the polycarboxylic acid, an oligomer (a low molecular weight polymer having a molecular weight of 1,000 or less) can also be used.

Since the weight average molecular weight and the acid value of the polyester resin are easily adjusted, it is preferable to use polycarboxylic acids of divalent or trivalent. From the viewpoint of the structure, it is preferable to use carboxylic acids having an aliphatic group and carboxylic acids having an aromatic group. Particularly, it is preferable to use adipic acid, terephthalic acid, isophthalic acid and trimellitic acid and it is also preferable to use two or more of these in combination.

The polyester resin synthesized by using a polyhydric alcohol or polycarboxylic acid having a low molecular weight has more ester bonds contained in the molecular chain compared to a case where a high molecular weight raw material is used and thus excellent abrasion resistance can be obtained. Accordingly, the molecular weight of the polyhydric alcohol is preferably 50 or more to 300 or less and the molecular weight of the polycarboxylic acid is preferably 100 or more to 300 or less.

The valences of the polyhydric alcohol and the polycarboxylic acid are preferably divalent or trivalent. When the valence is tetravalent or higher, the polyester resin to be synthesized has many branches and easily has a three-dimensionally complicated structure. In this case, the polyester resin tends to be not easily brought into a state in which the molecular chains of the polyester resin are entangled in a recording medium and the effect of further improving the abrasion resistance of an image may not be sufficiently obtained in some cases.

It is preferable that a unit having an aromatic group is present in the polyester resin. The polyester resin in which a unit having an aromatic group is present is easily brought into a state in which the molecular chains of the polyester resin are entangled in a recording medium due to the hydrophobic interaction between the aromatic groups and the abrasion resistance of an image can be further improved. The proportion (% by mass) of the unit having an aromatic group in the polyester resin is preferably 25% by mass or more to 50% by mass or less based on the total mass of the resin. The proportion (% by mass) of the unit having no aromatic group in the polyester resin is preferably 50% by mass or more to 75% by mass or less based on the total mass of the resin.

[Compound Represented by Formula (1)]

The resin particle formed of the polyester resin preferably contains a compound represented by Formula (1). That is, it is preferable that the resin particle has a compound represented by Formula (1) inside. Since the compound represented by Formula (1) interacts with the hydrophobic portion of the polyester resin, the action of immobilizing the molecular chain of the polyester resin by the hydrophobic interaction through the compound represented by Formula (1) is exhibited. Therefore, the dissolution of the polyester resin in the aqueous ink is suppressed in the ink and the storage stability can be further improved. In addition, since the cohesiveness of the polyester resin is increased in an image, the abrasion resistance can be further improved. A state in which the resin particle has the compound represented by Formula (1) inside refers to a state in which the compound represented by Formula (1) is present inside the three-dimensional structure formed by entangling the polyester resin.

(1)

In Formula (1), $R_1$, $R_2$ and $R_3$ each independently represent a hydrogen atom or an alkyl group having 1 to 4 carbon atoms.

In Formula (1), $R_1$, $R_2$ and $R_3$ each independently represent a hydrogen atom or an alkyl group having 1 to 4 carbon atoms. Examples of the alkyl group having 1 to 4 carbon atoms include a methyl group, an ethyl group, an n-propyl group, an iso-propyl group, an n-butyl group, an iso-butyl group, a t-butyl group and a sec-butyl group. Among these, a methyl group and a t-butyl group are preferable from the viewpoint of more efficiently causing an interaction with the hydrophobic portion of the polyester resin. Particularly, it is preferable that the compound represented by Formula (1) is 2,6-di-t-butyl-p-cresol (also known as dibutylhydroxytoluene, BHT).

The proportion (ppm) of the compound represented by Formula (1) in the resin particle is preferably 100 ppm or more to 1,000 ppm or less based on the total mass of the resin particle. That is, it is preferable that a value of [mass of compound represented by Formula (1)/(mass of compound represented by Formula (1)+mass of resin particle)×$10^6$] in the resin particle is 100 ppm or more to 1,000 ppm or less. When the proportion is less than 100 ppm, it is difficult to sufficiently immobilize the molecular chain of the polyester resin due to the hydrophobic interaction, the dissolution of the polyester resin in the aqueous ink cannot be sufficiently suppressed and the effect of further improving the storage stability may not be sufficiently obtained in some cases. On the other hand, when the proportion is more than 1,000 ppm, the compound represented by Formula (1) is easily unevenly distributed inside the resin particle due to the hydrophobic interaction between the particles of the compound. Then, since the polyester resin is not easily uniformly present over the entire image, the effect of further improving the abrasion resistance may not be sufficiently obtained in some cases.

The proportion of the compound represented by Formula (1) in the resin particle can be calculated as follows. First, the resin particle is collected from the liquid containing the ink and the resin particle. After measuring the mass of the resin particle, the resin particle is dissolved in an organic solvent (such as tetrahydrofuran) to prepare a sample. The compound represented by Formula (1) is quantified by performing analysis on this sample by gel permeation chromatography, liquid chromatography and the like. Then, the proportion is calculated from the mass of the resin particle measured in advance and the quantitative values of the compound represented by Formula (1).

[Physical Properties of Resin Particle]

Various suitable physical properties of the polyester resin forming the resin particle and the resin particle will be described.

[Carboxylic Acid Group Present on Particle Surface of Resin Particle]

In the resin particle formed of the polyester resin, the amount of the carboxylic acid groups present on the particle surface thereof is preferably 30 μmol/g or more to 110 μmol/g or less. This value represents the density (micromolar unit) of carboxylic acid groups present on the particle surface of the resin particle per unit mass of the resin particle. When the amount of the carboxylic acid groups present on the particle surface is less than 30 μmol/g, the repulsion of the electric charge generated between the plurality of carboxylic acid groups is weak, and the dispersion state of the resin particle is not easily stably maintained. Thus, a high level of storage stability of the ink may not be sufficiently obtained in some cases. On the other hand, when the amount of carboxylic acid groups present on the particle surface is more than 110 μmol/g, a high level of storage stability of the ink may not be sufficiently obtained in some cases. This is because the hydrophilicity of the resin particle becomes too high, the polyester resin forming the resin particle is gradually dissolved in the aqueous ink while the ink is stored, and thus the viscosity of the ink is easily increased. The amount of carboxylic acid groups present on the particle surface can be measured by colloidal titration using a potential difference. The amount of anionic groups other than the carboxylic acid group such as a sulfonic acid group present on the particle surface is preferably 5 μmol/g or less and more preferably 0 μmol/g.

[Acid Value of Polyester Resin]

The acid value of the polyester resin is preferably 3 mgKOH/g or more to 11 mgKOH/g or less. When the acid value is less than 3 mgKOH/g, the amount of the carboxylic acid groups is too small in the polyester resin as a whole, and thus the resin particle is easily aggregated. Therefore, a high level of storage stability of the ink may not be sufficiently obtained in some cases. On the other hand, when the acid value is more than 11 mgKOH/g, the amount of the carboxylic acid groups is too large in the polyester resin as a whole. Thus, even when the molar ratio of the carboxylic acid groups present on the particle surface is controlled, the hydrophilicity of the resin particle becomes too high. As a result, while the ink is stored, the polyester resin forming the resin particle is gradually dissolved in the aqueous ink, the viscosity of the ink is easily increased, and a high level of storage stability of the ink may not be sufficiently obtained in some cases. The acid value of the polyester resin can be measured by neutralization titration using a potential difference. The acid value X (mgKOH/g) and the amount Y (μmol/g) of the carboxylic acid groups can be converted based on Formula $X=Y\times56.1/1000$.

[Weight Average Molecular Weight of Polyester Resin]

The weight average molecular weight of the polyester resin is preferably 15,000 or more to 70,000 or less. When the weight average molecular weight of the polyester resin is less than 15,000, the molecular chains of the polyester resin are too short and not easily entangled with each other. Thus, the effect of further improving the abrasion resistance of an image may not be sufficiently obtained in some cases. On the other hand, when the weight average molecular weight is more than 70,000, the molecular chains of the polyester resin is too long, molecular motion does not easily occur and the molecular chains are not easily entangled with each other. Thus, the effect of further improving the abrasion resistance of an image may not be sufficiently obtained in some cases. The weight average molecular weight can be measured by gel permeation chromatography as a value in terms of polystyrene.

[Glass Transition Temperature of Resin Particle]

The glass transition temperature of the resin particle formed of the polyester resin is preferably 40° C. or higher. The glass transition temperature is an index indicating the ease of melting of the resin particle and means the temperature at which the resin particle start to change from a crystalline state to a non-crystalline state. As the glass transition temperature of the resin particle becomes higher, the resin particle tends to be present in a harder state near room temperature (25° C.). As the resin particle becomes harder, deformation due to an external force does not easily occur. Therefore, as the glass transition temperature of the resin particle increases, the strength of the resin layer formed of the polyester resin in the recording medium increases, and the abrasion resistance of an image is further improved. The glass transition temperature of the resin particle is preferably 120° C. or lower. The glass transition temperature can be measured using a thermal analyzer such as a differential scanning calorimeter (DSC).

[Particle Diameter of Resin Particle]

A volume-based cumulative 50% particle diameter of the resin particle is preferably 50 nm or more to 200 nm or less. In a case of considering a certain amount of the resin particle, the smaller the particle diameter, the larger the specific surface area, and the larger the particle diameter, the smaller the specific surface area. When the cumulative 50% particle diameter is less than 50 nm, a high level of storage stability of the ink may not be sufficiently obtained in some cases. This is because the specific surface area of the resin particle is large, the contact amount of the resin particle with the aqueous medium constituting the ink is increased, and the polyester resin forming the resin particle is gradually dissolved in the aqueous ink while the ink is stored, so that the viscosity of the ink is easily increased. On the other hand, when the cumulative 50% particle diameter is more than 200 nm, the dispersion state of the resin particle is not easily maintained stably. Thus, a high level of storage stability of the ink may not be sufficiently obtained in some cases. A volume-based cumulative 90% particle diameter of the resin particle is preferably 70 nm or more to 280 nm or less.

A ratio of the volume-based cumulative 50% particle diameter of the resin particle with respect to the volume-based cumulative 90% particle diameter of the resin particle is preferably 0.6 times or more. When the ratio is less than 0.6 times, the resin particle having a wide particle diameter distribution and significantly different particle diameters is present. When the resin particle with a large particle diameter collides with the resin particle with a small particle diameter, the resin particle is aggregated by so-called heteroaggregation, and thus a high level of storage stability of the ink may not be sufficiently obtained in some cases. The ratio is preferably 0.8 times or less.

The volume-based cumulative 50% particle diameter and the volume-based cumulative 90% particle diameter of the resin particle refer to particle diameters at which the particle diameter become 50% and 90% when the particle diameters are integrated from the small particle diameter side based on the total volume of the particles to be measured in the particle diameter integration curve. $D_{50}$ and $D_{90}$ of the resin particle can be measured by a dynamic light scattering method under the same conditions as the above-mentioned determination of whether or not the resin is the resin particle.

[Method for Producing Resin Particle]

A method for producing the resin particle is not particularly limited as long as the method is capable of obtaining the resin particle that is formed of a polyester resin having a carboxylic acid group and in which an amount of carboxylic acid groups present on the particle surface is 0.3 times or more to 0.8 times or less in terms of molar ratio with respect to all of the carboxylic acid groups. For example, the resin particle can be produced by synthesizing a polyester resin and then granulating the resin.

The polyester resin can be synthesized as follows. A polyhydric alcohol and a polycarboxylic acid are reacted (esterification reaction). As necessary, any of a polyhydric alcohol and a polycarboxylic acid is added to carry out a transesterification reaction for cleaving a part of the ester bond of a polyester resin. Thus, the molecular weight of the polyester resin is adjusted. The polyester resin can be obtained through such stages.

The polyester resin having a carboxylic acid group can be obtained, for example, as follows. In the esterification reaction, a method for adjusting the amount of the raw material used so that the number of moles of the carboxylic acid group of the polycarboxylic acid is larger than the number of moles of the hydroxy group of the polyhydric alcohol can be used. In addition, a method for using the polycarboxylic acid in the transesterification reaction can be used.

The esterification reaction is carried out in an atmosphere of an inert gas such as nitrogen gas. The reaction temperature in the esterification reaction is preferably 180° C. to 260° C. The reaction time in the esterification reaction is preferably 2.5 to 10 hours and more preferably 4 to 6 hours.

By reducing the pressure in the reaction system during the esterification reaction, the water generated in the esterification reaction may be discharged to the outside of the system to promote the esterification (dehydration condensation) reaction. The reaction under reduced pressure is carried out in an atmosphere of an inert gas such as nitrogen gas, following the esterification reaction. The reaction temperature under reduced pressure is preferably 220° C. to 280° C. The reaction time under reduced pressure is preferably 2.5 to 10 hours and more preferably 4 to 6 hours. The degree of pressure reduction (degree of vacuum) is preferably 1 Pa or more to 130 Pa or less. However, when the degree of pressure reduction is too low, the reaction efficiency is decreased and the weight average molecular weight of the polyester resin is reduced. Therefore, it is preferable to adjust the degree of pressure reduction according to the desired reaction conditions. It is preferable that the pressure is gradually reduced over a period of about 60 to 180 minutes from the atmospheric pressure (101325 Pa) to 130 Pa or less.

The transesterification reaction is carried out to adjust the molecular weight of the polyester resin by adding any of a polyhydric alcohol and a polycarboxylic acid to cleave a part of the ester bond of the polyester resin. From the viewpoint of efficiently obtaining the polyester resin having a carboxylic acid group, the transesterification reaction is preferably carried out using a polycarboxylic acid. In addition, since it is easy to adjust the weight average molecular weight and the acid value of the polyester resin in a well-balanced manner, it is preferable to carry out the transesterification reaction using trimellitic acid (which may be an anhydride).

The transesterification reaction is also carried out in an atmosphere of an inert gas such as nitrogen gas, following the esterification reaction. The reaction temperature in the transesterification reaction is preferably 180° C. to 260° C. The reaction time in the transesterification reaction is preferably 1 to 5 hours. The transesterification reaction can be carried out in the presence of a catalyst or a heat stabilizer. Examples of the catalyst include zinc acetate, antimony trioxide, tetra-n-butyl titanate and n-butyl hydroxyoxytin. The amount (mol) of the catalyst used is preferably $1\times10^{-1}$ mol to $20\times10^{-4}$ mol with respect to 1 mol of the polyhydric alcohol or the polycarboxylic acid. Examples of the heat stabilizer include acids such as phosphoric acid and acid esters such as triethyl phosphate.

It is preferable that the polyester resin synthesized as described above is used in the next step for granulation after being formed into an appropriate form by pressurization, pulverization or the like. Since the resin particle formed of the polyester resin is used as a constituent component of the aqueous ink, it is preferable to granulate the resin particle to be in a state of a dispersion liquid in which the resin particle is dispersed in an aqueous liquid medium (a liquid containing the resin particle). The aqueous liquid medium mainly contains water such as deionized water, ion exchange water and distilled water and may contain a water-soluble organic solvent as necessary. The aqueous liquid medium preferably has a water content of 50% by mass or more and it is also preferable to use water that does not contain a water-soluble organic solvent.

Examples of a method for granulating the polyester resin to form the resin particle include a dispersion method and a phase inversion (emulsification) method. Examples of the dispersion method include the following (1) and (2). (1) There is a method for dispersing a polyester resin by adding a solution in which a polyester resin is dissolved in an organic solvent to an aqueous liquid medium. In addition, (2) there is a method for dispersing a polyester resin by adding the polyester resin to an organic solvent, further adding an aqueous liquid medium, and mixing the components. As the phase inversion (emulsification) method, a method in which in a process of adding an aqueous liquid medium to a solution in which a polyester resin is dissolved in an organic solvent to perform phase inversion from an organic solvent phase to an aqueous phase, the polyester resin is precipitated in the form of particles may be used. In either method, it is preferable to adjust the particle diameter of the resin particle by granulating the resin while applying an appropriate shearing force using a known disperser.

Since the molar ratio of the carboxylic acid group present on the particle surface to all of the carboxylic acid groups can be adjusted with high accuracy, it is preferable to produce the resin particle by the phase inversion (emulsification) method. Hereinafter, the method for producing the resin particle by the phase inversion (emulsification) method will be described.

The polyester resin is dissolved in an organic solvent capable of dissolving the polyester resin. Examples of the organic solvent include ethers such as tetrahydrofuran and dibutyl ether, ketones such as acetone and methyl ethyl ketone and alcohols such as isopropanol. In this step, when only an organic solvent (such as methyl ethyl ketone) that has low solubility in water and is immiscible at an arbitrary proportion is used, it may be difficult to adjust the molar ratio of the carboxylic acid groups present on the particle surface with respect to all of the carboxylic acid groups to be within a predetermined range in some cases. Accordingly, as the organic solvent, ethers such as tetrahydrofuran are preferably used since the solvent can be miscible with water at an arbitrary proportion. Ethers such as tetrahydrofuran are also preferable from the viewpoint of excellent solubility of the polyester resin. In a case where the resin particle contains the compound represented by Formula (1) described above, it is preferable to add the compound represented by Formula (1) in this step. In addition, in the step, when the concentration of the polyester resin in the solution is dilute, it may be difficult to adjust the molar ratio of the carboxylic acid groups present on the particle surface with respect to all of the carboxylic acid groups to be within a predetermined range in some cases. Therefore, in the step, the content (% by mass) of the polyester resin in the solution is preferably 20.0% by mass or more to 80.0% by mass or less and more preferably 30.0% by mass or more to 50.0% by mass or less.

Next, the aqueous liquid medium is gradually added to the solution of the polyester resin obtained above to precipitate the resin particle. In order that the dispersion state of the resin particle can be maintained stably, it is preferable to add a base before or during the addition of the aqueous liquid medium. Examples of the base include alkali metal hydroxides such as sodium hydroxide and potassium hydroxide and ammonia, and these are preferably added in the form of an aqueous solution. There are cations in the system to which a base is added. In an attempt to neutralize the cation, the carboxylic acid group of the polyester resin is granulated in a state of being located on the particle surface, so that the resin particle having a carboxylic acid group on the particle surface can be formed. That is, when the amount of the base in the system is adjusted, the amount of carboxylic acid groups present on the particle surface of the resin particle can be accurately adjusted. When the amount of the base is large, the amount of carboxylic acid groups on the particle surface of the resin particle is increased and when the amount of the base is small, the amount of carboxylic acid groups on the particle surface of the resin particle is reduced. The amount of the base used can be controlled by controlling a neutralization rate (% by mole) based on the acid value corresponding to all of the carboxylic acid groups of the polyester resin. As the amount of the aqueous liquid medium added increases, the initially transparent solution becomes cloudy and is emulsified to form the resin particle. The particle diameter and the particle size distribution of the resin particle can be controlled by the content of the polyester resin in the solution, the addition rate of the aqueous liquid medium, the shearing force at the time of dispersion and the like.

With respect to the emulsion thus obtained, the organic solvent is distilled off under reduced pressure and as necessary, the emulsion is filtered through a filter (stainless steel mesh) having an appropriate pore diameter or the like to remove coarse particles. Then, by adjusting the content of the resin particle by adding water, a liquid containing the resin particle (an aqueous dispersion liquid of the resin particle) can be prepared. The water used for adjusting the content is preferably deionized water, ion exchange water, or distilled water. From the viewpoint of ink productivity, the content (% by mass) of the resin particle in the liquid containing the resin particle is preferably 10.0% by mass or more to 50.0% by mass or less and more preferably 20.0% by mass or more to 45.0% by mass or less.

[Composition Analysis of Resin Particle]

The fact that the resins constituting the resin particle are the polyester resin can be determined by, for example, the following method. First, the resin particle is dissolved in an organic solvent capable of dissolving the resin particle, such as tetrahydrofuran, to prepare a sample. The resin particle used at this time may be in a state of an aqueous dispersion liquid or in a dry state. The obtained sample is analyzed by nuclear magnetic resonance (NMR) spectroscopy, matrix-assisted laser desorption ionization mass spectrometry (MALDI-MS) or the like. Thus, the types and proportions of the units (monomers) constituting the resin can be known. Further, the resin particle can be analyzed by thermal decomposition gas chromatography to detect the units (monomers) constituting the resin. In addition, when the sample is prepared, in a case where insoluble matter that is not dissolved in the organic solvent is generated, the insoluble matter is analyzed by pyrolysis gas chromatography, so that the unit (monomer) constituting the resin can be detected.

(Coloring Material)

A pigment and a dye can be used as a coloring material to be contained in the ink. It is preferable to use a pigment as the coloring material. A pigment which has particles having a particle diameter tends to easily deteriorate the abrasion resistance of a recorded image unlike a dye which is a coloring material having no particle diameter. However, by using the above-mentioned resin particle, even when the coloring material is a pigment, deterioration in abrasion resistance can be effectively suppressed. The content (% by mass) of the coloring material in the ink is preferably 0.1% by mass or more to 15.0% by mass or less and more preferably 1.0% by mass or more to 10.0% by mass or less based on the total mass of the ink.

Specific examples of the dye include compounds having a skeleton such as azo, triphenylmethane, (aza)phthalocyanine, xanthene and anthrapyridone. As the dye, it is preferable to use a compound having an anionic group.

Specific examples of the pigment include inorganic pigments such as carbon black and titanium oxide and organic pigments such as azo, phthalocyanine, quinacridone, isoindolinone, imidazolone, diketopyrrolopyrrole, dioxazine and perinone.

As a pigment dispersion method, a resin-dispersed pigment using a resin as a dispersant, a self-dispersible pigment in which a hydrophilic group is bonded to the particle surface of the pigment or the like can be used. In addition, a resin-bonded type pigment in which an organic group containing a resin is chemically bonded to the particle surface of the pigment, a microcapsule pigment in which the particle surface of the pigment is coated with a resin and the like can be used. Among these, it is preferable to use a self-dispersible pigment or a resin-dispersed pigment in which a resin as a dispersant is physically adsorbed on the particle surface of the pigment, instead of a resin-bonded type pigment or a microcapsule pigment. As the dispersant for the resin-dispersed pigment, it is more preferable to use a water-soluble resin instead of a water-insoluble resin.

Examples of the self-dispersible pigment include pigments in which an anionic group is bonded to the particle surface of the pigment directly or via another atomic group. Examples of the anionic group include a carboxylic acid group, a sulfonic acid group, a phosphoric acid group and a phosphonic acid group. Examples of the counter ion of the anionic group include cations such as hydrogen atom, alkali metal, ammonium and organic ammonium. In addition, it is preferable that the other atomic group is a group having a function of a spacer between the particle surface of the pigment and the ionic group and the molecular weight is 1,000 or less. Examples of the other atomic group include an alkylene group having about 1 to 6 carbon atoms, an arylene group such as a phenylene group and a naphthylene group, an ester group, an imino group, an amide group, a sulfonyl group and an ether group. Further, a group obtained by combining these groups may also be used.

As the resin dispersant for dispersing the pigment in the aqueous medium, it is preferable to use a resin capable of dispersing the pigment in the aqueous medium by the action of an anionic group. Examples of the resin dispersant include acrylic resins and urethane-based resins. Among these, an acrylic resin is preferable and an acrylic resin having a hydrophilic unit and a hydrophobic unit as constituent units is more preferable. Particularly, it is preferable to have a hydrophilic unit derived from (meth)acrylic acid and a hydrophobic unit derived from a monomer having an aliphatic group or an aromatic group.

The hydrophilic unit is a unit having a hydrophilic group such as an anionic group, a hydroxy group and an ethylene oxide group. The hydrophilic unit can be formed by polymerizing, for example, a monomer having a hydrophilic group. Specific examples of the monomer having a hydrophilic group include an acidic monomer having a carboxylic acid group such as (meth)acrylic acid, an anionic monomer such as an anhydride or a salt of these acidic monomers, a monomer having a hydroxy group such as 2-hydroxyethyl (meth)acrylate and a monomer having an ethylene oxide group such as methoxypolyethylene glycol (meth)acrylate. Examples of the cation constituting the salt of the acidic monomer include ions such as lithium, sodium, potassium, ammonium and organic ammonium.

The hydrophobic unit is a unit that does not have a hydrophilic group such as an anionic group, a hydroxy group, or an ethylene oxide group. The hydrophobic unit can be formed by polymerizing, for example, a hydrophobic monomer having no hydrophilic group. Specific examples of the hydrophobic monomer include monomers having an aromatic group such as styrene, α-methylstyrene and benzyl (meth)acrylate and monomers having an aliphatic group such as ethyl (meth)acrylate, methyl (meth)acrylate, (iso-)propyl (meth)acrylate, butyl (meth)acrylate and 2-ethylhexyl (meth)acrylate.

In a case where the ink contains a pigment, it is preferable that a mass ratio of the content (% by mass) of the resin particle is with respect to the content (% by mass) of the pigment in the ink 0.5 times or more to 3.0 times or less. When the ratio is less than 0.5 times, the amount of the resin particle is too small with respect to the pigment and thus a higher level of abrasion resistance of an image may not be sufficiently obtained in some cases. On the other hand, when the ratio is more than 3.0 times, the number of the resin particle is too large with respect to the pigment, so that the number of the resin particle that is softer than the pigment becomes larger, an image is easily deformed by abrasion and thus, a higher level of abrasion resistance of an image may not be sufficiently obtained in some cases.

(Aqueous Medium)

The ink of the present invention is an aqueous ink containing an aqueous medium which is water or a mixed solvent of water and a water-soluble organic solvent. As the water, a deionized water (ion exchange water) is preferably used. The content (% by mass) of the water in the ink is preferably 50.0% by mass or more to 95.0% by mass or less based on the total mass of the ink. As the water-soluble organic solvent, any solvent that can be used for an ink for ink jet, such as alcohols, glycols, (poly)alkylene glycols, nitrogen-containing compounds and sulfur-containing compounds, can be used. The content (% by mass) of the water-soluble organic solvent in the ink is preferably 3.0% by mass or more to 50.0% by mass or less based on the total mass of the ink. When the content of the water-soluble organic solvent is out of the above range, the reliability of the aqueous ink for ink jet, such as sticking resistance, may be slightly lowered in some cases.

(Other Components)

The ink may also contain a water-soluble organic compound that is solid at 25° C., such as polyhydric alcohols such as trimethylolpropane and trimethylolethane and urea derivatives such as urea and ethylene urea, as necessary, in addition to the above-mentioned components. In addition, the ink may optionally contain various additives such as a surfactant, a pH adjusting agent, an antifoaming agent, a rust inhibitor, a preservative, a fungicide, an antioxidant, a reduction inhibitor and a chelating agent as necessary. In a case where a surfactant is used, the content (% by mass) of the surfactant in the ink is preferably 0.1% by mass or more to 5.0% by mass or less and more preferably 0.1% by mass or more to 2.0% by mass or less based on the total mass of the ink.

The ink may contain other resins in addition to the resin particle formed of the polyester resin. Other resins also include dispersants for dispersing pigments. As the other resin, it is preferable to use a water-soluble resin. Examples of the form of the water-soluble resin include a block copolymer, a random copolymer, a graft copolymer and a combination thereof. Examples of the water-soluble resin include acrylic resins, urethane resins and olefin resins. Among these, acrylic resins and urethane resins are preferable.

(Physical Properties of Ink)

The viscosity of the ink at 25° C. is preferably 1.0 mPa·s or more to 10.0 mPa·s or less, more preferably 1.0 mPa·s or more to 5.0 mPa·s or less and particularly preferably 1.0 mPa·s or more to 3.0 mPa·s or less. The surface tension of the ink at 25° C. is preferably 10 mN/m or more to 60 mN/m or less, more preferably 20 mN/m or more to 60 mN/m or less and particularly preferably 30 mN/m or more to 50 mN/m or less. In addition, the pH of the ink at 25° C. is preferably 5.0 or more to 10.0 or less and more preferably 7.0 or more to 9.5 or less.

(Method for Producing Ink)

A method for producing the ink of the present invention is a method for producing an aqueous ink containing a resin particle and the method includes a step of producing a resin particle and a step of mixing the resin particle obtained in the above step with other ink components to produce an aqueous ink. The step of producing the resin particle has the following steps (1) and (2). (1) A synthetic step of reacting a polycarboxylic acid with a polyhydric alcohol to synthesize a polyester resin having a carboxylic acid group. (2) A phase inversion step of dissolving a polyester resin in an organic solvent and then subjecting the solution to phase inversion to an aqueous phase in the presence of a base to obtain predetermined resin particle. In the predetermined resin particle, the amount of the carboxylic acid groups present on the particle surface of the resin particle is 0.3 times or more to 0.8 times or less in terms of molar ratio with respect to all of the carboxylic acid groups of the polyester resin having the carboxylic acid group. The "other ink components" can be appropriately selected from the coloring material, the aqueous medium, other components and the like described above.

<Ink Cartridge>

Figure 1:
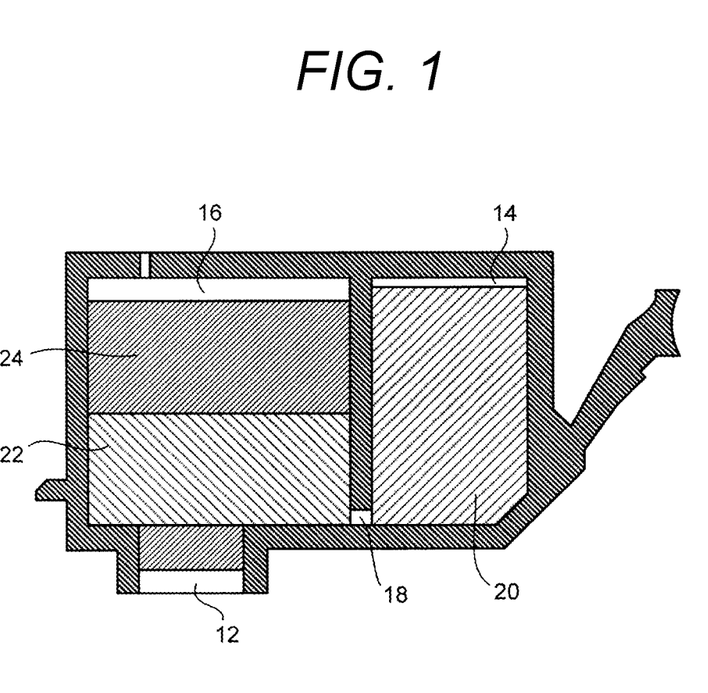
FIG. 1 is a cross-sectional view schematically illustrating an exemplary embodiment of an ink cartridge of the present invention.

An ink cartridge according to the present invention includes an ink and an ink storage portion that stores the ink. The ink contained in the ink storage portion is the aqueous ink of the present invention described above. FIG. 1 is a cross-sectional view schematically illustrating an exemplary embodiment of an ink cartridge of the present invention. As illustrated in FIG. 1, an ink supply port 12 for supplying an ink to a recording head is arranged on the bottom surface of the ink cartridge. The inside of the ink cartridge is an ink storage portion for storing the ink. The ink storage portion includes an ink storage chamber 14 and an absorber storage chamber 16 and the chambers communicate with each other through a communication port 18. In addition, the absorber storage chamber 16 communicates with the ink supply port 12. While a liquid ink 20 is stored in the ink storage chamber 14, absorbers 22 and 24 each holding the ink in a state of being impregnated therewith are stored in the absorber storage chamber 16. The ink storage portion may be of a form that is free of the ink storage chamber that stores the liquid ink and holds the total amount of the ink to be stored with the absorbers. In addition, the ink storage portion may be of a form that is free of any absorber and stores the total amount of the ink in a liquid state. Further, an ink cartridge of a form formed to have an ink storage portion and a recording head may be adopted.

<Ink Jet Recording Method>

An ink jet recording method according to the present invention is a method including ejecting the aqueous ink of the present invention described above from an ink jet recording head to record an image on a recording medium. Examples of a system of ejecting an ink include a system of applying a mechanical energy to an ink and a system of applying a thermal energy to an ink. In the present invention, it is particularly preferable to employ a system of ejecting an ink by applying a thermal energy to the ink. Steps of the ink jet recording method may be those known steps except that the ink according to the present invention is used. In addition to these steps, a step of applying a reaction liquid that reacts with the ink to a recording medium in advance, a step of drying the ink, a step of heating the recording medium on which the image is recorded and the like may be performed. The ink jet recording method of the present invention preferably includes a step of recording an image on a recording medium using aqueous ink and a step of heating the recording medium. When the recording medium is heated, the resin particle attached to the recording medium is melted and thus the abrasion resistance of the image can be further improved. It is not necessary to perform a step of curing the ink or the image by irradiating the ink or the image with an active energy ray or the like.

Figure 2A:
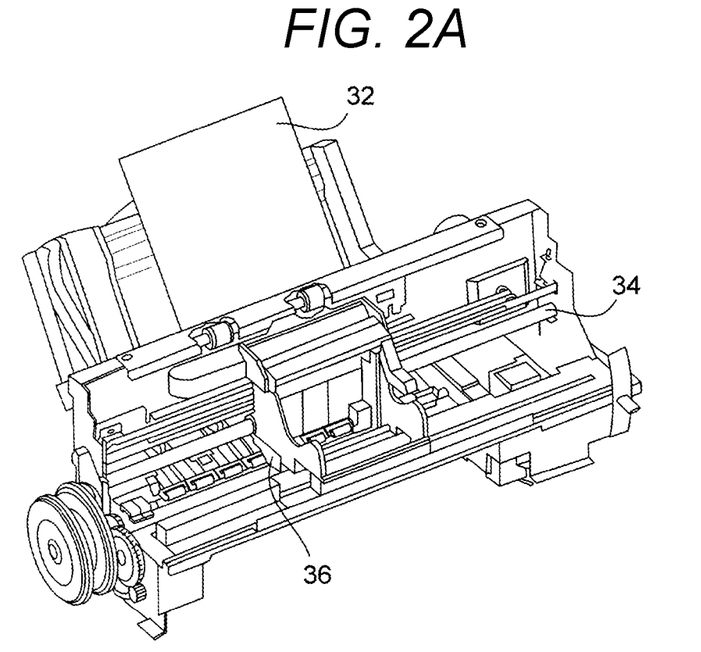
FIG. 2A is a perspective view schematically illustrating an example of a principal part of an ink jet recording apparatus used in an ink jet recording method according to the present invention.
Figure 2B:
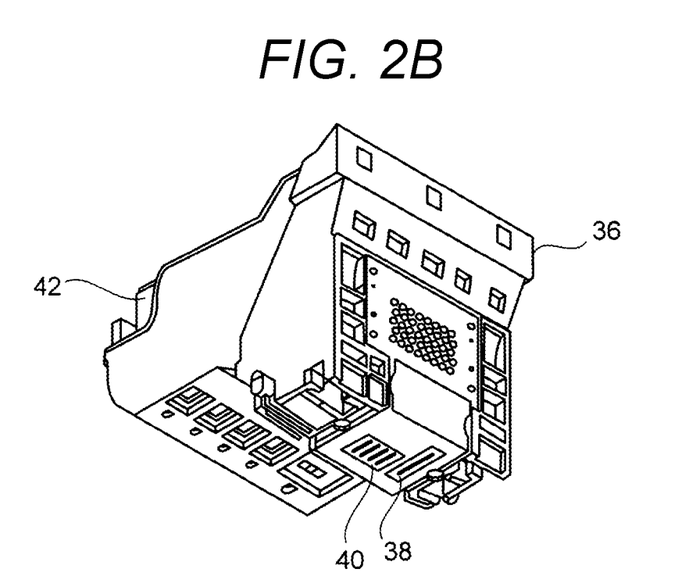
FIG. 2B is a perspective view schematically illustrating an example of a head cartridge used in the ink jet recording method according to the present invention.

FIGS. 2A and 2B are views schematically illustrating an example of an ink jet recording apparatus used in the ink jet recording method of the present invention, FIG. 2A is a perspective view of a principal part of the ink jet recording apparatus and FIG. 2B is a perspective view illustrating a head cartridge. In the ink jet recording apparatus, a conveyance unit (not shown) that conveys a recording medium 32 and a carriage shaft 34 are provided. A head cartridge 36 can be mounted on the carriage shaft 34. The head cartridge 36 includes recording heads 38 and 40 and is configured such that an ink cartridge 42 is set. The ink (not illustrated) is ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32. As the recording medium, any of a recording medium having ink absorbency such as paper and a recording medium having no ink absorbency such as a sheet or film made of resin can be used.

EXAMPLES

Hereinafter, the present invention will be described in more detail by way of Examples and Comparative Examples. However, the present invention is not intended to be limited to the following examples as long as the present invention does not depart from its gist. In the description of the amounts of components, "part(s)" and "%" are based on mass unless otherwise specified.

<Measuring Method of Physical Property Value>

(Carboxylic Acid Group of Particle Surface of Resin Particle)

The amount of carboxylic acid groups on the particle surface of the resin particle was measured as follows. A liquid containing resin particles was used as a sample. This sample was subjected to colloidal titration using a potential difference and the amount of carboxylic acid groups on the particle surface of the resin particle was measured. In the colloidal titration, a potential difference automatic titrator (trade name "AT510", manufactured by Kyoto Electronics Manufacturing Co., Ltd.) on which a flow potential titration unit (trade name "PCD-500", manufactured by Kyoto Electronics Manufacturing Co., Ltd.) was mounted was used. As a titration reagent, a 0.005 mol/L methyl glycol chitosan solution was used.

(Acid Value of Polyester Resin)

The acid value of the polyester resin was measured as follows. The resin particle was collected from the liquid containing the resin particle and washed with 1.0 mol/L hydrochloric acid and then water. The resin particle was added to 60 mL of a liquid in which water and tetrahydrofuran were mixed at a mass ratio of 1:6 and the resin was dissolved at 25° C. to prepare a sample. Neutralization titration was performed on this sample and the acid value of the polyester resin was measured. In the neutralization titration, a potential difference automatic titrator (trade name "AT510", manufactured by Kyoto Electronics Manufacturing Co., Ltd.) on which a composite glass electrode (trade name "C-171", manufactured by Kyoto Electronics Manufacturing Co., Ltd.) was mounted was used. As a titration reagent, a 0.5 mol/L potassium hydroxide ethanol solution was used.

(Weight Average Molecular Weight of Polyester Resin)

The weight average molecular weight of the polyester resin was measured as follows. The resin particle formed of polyester resin was added to tetrahydrofuran at 25° C. for 24 hours, the resin was dissolved in tetrahydrofuran in an environment of 25° C. for 24 hours and then filtration was performed using a membrane filter to prepare a sample. The content of the polyester resin in the sample was adjusted to be about 0.3%. For this sample, the weight average molecular weight of the polyester resin was measured by gel permeation chromatography under the following conditions.

HPLC apparatus: trade name "2695 Separations Module" (manufactured by Waters Corporation)

Differential refractive index (RI) detector: trade name "2414 detector" (manufactured by Waters Corporation)

Column: four continuous columns of trade name "GPC KF-806M" (manufactured by Showa Denko K. K.)

Eluent: tetrahydrofuran

Flow rate: 1.0 mL/min

Oven temperature: 40° C.

Sample injection amount: 100 μL

A molecular weight calibration curve created using standard polystyrene resins (trade name "TSK STANDARD POLYSTYRENE" F-850, F-450, F-288, F-128, F-80, F-40, F-20, F-10, F-4, F-2, F-1, A-5000, A-2500, A-1000 and A-500, manufactured by Tosoh Corporation) was used to calculate the weight average molecular weight.

(Glass Transition Temperature of Resin Particle)

The glass transition temperature of the resin particle was measured as follows. The liquid containing the resin particle was dried at 60° C. to prepare solid resin particle. 2 mg of this solid was collected and sealed in an aluminum container. Then, thermal analysis was performed with the following temperature program using a differential scanning calorimeter (trade name "Q1000", manufactured by TA instruments). First, the temperature was raised to 200° C. at 10° C./min, and then lowered from 200° C. to −50° C. at 5° C./min. Next, thermal analysis was performed while raising the temperature from −50° C. to 200° C. at 10° C./min to create a temperature rise curve. In this temperature rise curve (horizontal axis: temperature, vertical axis: calorific value), the temperature the intersection with the tangent line drawn at the point where the gradient of the straight line that passes through two points in the curve on the low temperature side and extends to the high temperature side and the curve of the stepped change part in the curve was the maximum was obtained and used as the glass transition temperature of the resin particle.

(Determination of Whether or Not Resin is Resin Particle and Particle Diameter)

The determination of whether or not the resin is the resin particle and the measurement of the particle diameter ($D_{50}$ and $D_{90}$) of the resin particle were performed as follows. The liquid containing the resin was diluted with pure water to prepare a sample having a resin content of about 1.0%. The particle diameter of this sample was measured using a particle size distribution meter (trade name "NANOTRACK WAVEII-Q", manufactured by Microtrac Bell Co., Ltd.) by a dynamic light scattering method. The measurement is performed under the conditions of a SetZero of 30 seconds, a number of measurements of 3 times, a measurement time of 180 seconds, a shape of real spherical shape, a refractive index of 1.6 and a density of 1.0. In the above method, when the particle having a particle diameter was measured, the resin was determined to be the "resin particle (that is, "water-dispersible resin")" and when the particle having a particle diameter was not measured, the resin was determined not to be the "resin particle (that is, "water-soluble resin").

(Proportion of Compound Represented by Formula (1) in Resin Particle)

The proportion of the compound represented by Formula (1) in the resin particle was measured as follows. The area of the peak derived from polyester and the peak derived from the compound represented by Formula (1) was obtained by a differential refractive index (RI) detector in the same manner as the measuring method of the weight average molecular weight described above. The ratio was calculated from the obtained area.

(Viscosity of Ink)

The viscosity of the ink was measured using an E-type viscometer (trade name "RE80-L", manufactured by Told Sangyo) that circulates an antifreeze solution in a constant temperature tank set at 25° C. through a tube with a rotor (1°34'×R24) attached.

<Synthesis of Polyester Resin>

A mixture of the components (units: parts) shown in the item of "Esterification reaction" in Table 1 was placed in a reaction vessel, then the reaction vessel was installed in an autoclave and heated at 220° C. for 4 hours to carry out an esterification reaction. In Table 1, the abbreviations of the components each represent EG: ethylene glycol, NPG: neopentyl glycol, BPA: bisphenol A, GLY: glycerin, tPA: terephthalic acid, iPA: isophthalic acid, BTA: trimellitic acid and HAD: adipic acid. Then, the temperature was raised to 240° C. and the pressure in the autoclave was reduced to 13 Pa over 90 minutes. After continuing the esterification (dehydration condensation) reaction while maintaining a reduced pressure of 13 Pa at 240° C. for 5 hours, nitrogen gas was introduced into the autoclave to return to normal pressure. The temperature inside the reaction vessel was lowered to 220° C., the catalyst (tetra-n-butyl titanate) and the components (unit: part) shown in the item "Transesterification reaction" in Table 1 were added and the mixture was heated at 220° C. for 2 hours to carry out a transesterification reaction. The amount (mol) of the catalyst used was $3\times10^{-4}\times$ the total amount (mol) of polycarboxylic acid used. Then, nitrogen gas was introduced into the autoclave to make a pressurized state and the sheet-shaped resin was taken out. This resin was cooled to 25° C. and then crushed with a crusher to obtain a polyester resin. The acid value and the weight average molecular weight corresponding to all carboxylic acid groups of the polyester resin are shown on the right side of Table 1.

TABLE 1

Synthetic conditions and characteristics of polyester resin

| | | Synthetic conditions | | | | | | | | | | | | Characteristics | |
|---|---|---|---|---|---|---|---|---|---|---|---|---|---|---|---|
| | | Esterification reaction | | | | | | | | Transesterification reaction | | | Total amount used | | Acid value (mgKOH/g) | Weight average molecular weight |
| | | EG | NPG | BPA | GLY | tPA | iPA | BTA | HAD | BTA | HAD | GLY | Polyhydric alcohol | Polycarboxylic acid | | |
| Poly- | 1 | 90.0 | | 10.0 | | 50.0 | 50.0 | 7.6 | | 2.4 | | | 100.0 | 110.0 | 7 | 35,000 |
| ester | 2 | | 90.0 | 10.0 | | 50.0 | 50.0 | 7.6 | | 2.4 | | | 100.0 | 110.0 | 7 | 35,000 |
| resin | 3 | 90.0 | | | 10.0 | 50.0 | 50.0 | 7.6 | | 2.4 | | | 100.0 | 110.0 | 7 | 35,000 |
| | 4 | 90.0 | | 10.0 | | 50.0 | 50.0 | | 7.6 | | 2.4 | | 100.0 | 110.0 | 7 | 35,000 |
| | 5 | 90.0 | | 10.0 | | 45.0 | 45.0 | 7.6 | | 2.4 | | | 100.0 | 100.0 | 5 | 35,000 |
| | 6 | 90.0 | | 10.0 | | 50.0 | 50.0 | 7.2 | | 2.8 | | | 100.0 | 110.0 | 9 | 29,000 |
| | 7 | 90.0 | | 20.0 | | 45.0 | 45.0 | 7.6 | | 2.4 | | | 110.0 | 100.0 | 2 | 35,000 |
| | 8 | 90.0 | | 20.0 | | 45.0 | 45.0 | 7.0 | | 3.0 | | | 110.0 | 100.0 | 3 | 25,000 |
| | 9 | 90.0 | | 10.0 | | 50.0 | 50.0 | 6.9 | | 3.1 | | | 100.0 | 110.0 | 11 | 24,000 |
| | 10 | 90.0 | | 10.0 | | 50.0 | 50.0 | 6.8 | | 3.2 | | | 100.0 | 110.0 | 12 | 22,000 |
| | 11 | 90.0 | | 20.0 | | 45.0 | 45.0 | 6.2 | | 3.8 | | | 110.0 | 100.0 | 7 | 12,000 |
| | 12 | 90.0 | | 20.0 | | 45.0 | 45.0 | 6.4 | | 3.6 | | | 110.0 | 100.0 | 6 | 15,000 |
| | 13 | 90.0 | | 10.0 | | 50.0 | 50.0 | 9.7 | | 0.3 | | | 100.0 | 110.0 | 4 | 70,000 |
| | 14 | 90.0 | | 10.0 | | 50.0 | 50.0 | 9.9 | | 0.1 | | | 100.0 | 110.0 | 4 | 74,000 |
| | 15 | 90.0 | | 10.0 | | 31.5 | 31.5 | 7.6 | 37.0 | 2.4 | | | 100.0 | 110.0 | 7 | 35,000 |
| | 16 | 90.0 | | 10.0 | | 33.5 | 33.0 | 7.6 | 33.5 | 2.4 | | | 100.0 | 110.0 | 7 | 35,000 |
| | 17 | | | 100.0 | | 50.0 | 50.0 | 7.6 | | 2.4 | | | 100.0 | 110.0 | 7 | 35,000 |
| | 18 | 90.0 | | 10.0 | | 50.0 | 50.0 | | | | | 10.0 | 110.0 | 100.0 | — | — |

<Manufacturing of Resin Particle>
(Resin Particles 1 to 38)

A stirrer (trade name "TORNADO STIRRER STANDARD SM-104", manufactured by AS ONE) was set in a beaker having a volume of 2 L. In this beaker, 210 g of the polyester resin of the type shown in Table 2, the organic solvent (unit: g) and the compound represented by Formula (1) (indicated as "Formula (1)" in Table 2, unit: mg) were placed and the materials were stirred at 25° C. to dissolve the polyester resin. As the compound represented by Formula (1), 2,6-di-t-butyl-p-cresol was used. In Table 2, the abbreviations for organic solvents each represent THF: tetrahydrofuran, MEK: methyl ethyl ketone and IPA: isopropanol. Next, a 5% aqueous sodium hydroxide solution in an amount used corresponding to the neutralization rate (% by mole) based on the acid value corresponding to all the acid groups of the polyester resin was added, and the mixture was stirred for 30 minutes. Further, 900 g of deionized water was added dropwise to the beaker at a rate of 20 mL/min while stirring at 10° C. and 150 rpm. Then, the temperature was raised to 60° C., the organic solvent was distilled off under reduced pressure, and a part of water was also distilled off. The beaker was placed in a water bath, the resultant was continuously stirred at 85° C. at the stirring rate for heat treatment time shown in Table 2 and a heat treatment was performed. Then, the content of the beaker was filtered using a 150-mesh wire mesh (a filter in which 150 stainless steel wires each were woven vertically and horizontally in 1-inch square). Next, an appropriate amount of deionized water was added to adjust the content of the resin particle and a liquid containing each resin particle having a resin particle content of 25.0% was obtained. However, with the resin particle 36 produced using the polyester resin having no carboxylic acid group, a liquid containing the resin particle in a uniform state could not be obtained due to the formation of aggregates in the production process.

Table 2 shows the volume-based cumulative 50% particle diameter $D_{50}$, the volume-based cumulative 90% particle diameters $D_{90}$ and the ratio $D_{50}/D_{90}$ of the resin particle. In addition, the amount of the carboxylic acid groups present on particle surface and the molar ratio of the carboxylic acid groups present on particle surface to all of the carboxylic acid groups of the polyester resin having the carboxylic acid group are shown. For the sake of simplicity, these are referred to as "carboxylic acid group of particle surface" and "molar ratio of carboxylic acid group of particle surface". Further, the ratio of the compound represented by Formula (1) in the resin particle (denoted as "Proportion of Formula (1) in resin particle") and the glass transition temperature are shown.

TABLE 2

Production conditions and characteristics of resin particle

| | | Production conditions | | | | | | | Characteristics | | | | | | |
|---|---|---|---|---|---|---|---|---|---|---|---|---|---|---|---|
| | | Type of polyester resin | Organic solvent | | | Formula (1) BHT (mg) | Neutralization rate (% by mole) | Conditions Stirring rate (rpm) | Heat treatment (hour) | $D_{50}$ (nm) | $D_{90}$ (nm) | $D_{50}/D_{90}$ (times) | Carboxylic acid group of particle surface (µmol/g) | Molar ratio of carboxylic acid group of particle surface (times) | Proportion of Formula (1) in resin particle (ppm) | Glass transition temperature (° C.) |
| | | | THF (g) | MEK (g) | IPA (g) | | | | | | | | | | | |
| Resin particle | 1 | 1 | 390 | | | 100 | 80 | 150 | 1 | 120 | 170 | 0.7 | 65 | 0.5 | 450 | 86 |
| | 2 | 2 | 390 | | | 100 | 80 | 150 | 1 | 120 | 170 | 0.7 | 64 | 0.5 | 450 | 64 |
| | 3 | 3 | 390 | | | 100 | 80 | 150 | 1 | 120 | 170 | 0.7 | 66 | 0.5 | 450 | 80 |
| | 4 | 4 | 390 | | | 100 | 80 | 150 | 1 | 120 | 170 | 0.7 | 63 | 0.5 | 450 | 76 |
| | 5 | 1 | 195 | 195 | | 100 | 80 | 150 | 1 | 120 | 170 | 0.7 | 65 | 0.5 | 450 | 86 |
| | 6 | 1 | | 195 | 195 | 100 | 80 | 150 | 1 | 120 | 170 | 0.7 | 65 | 0.5 | 450 | 86 |
| | 7 | 1 | 315 | | | 100 | 80 | 100 | 1 | 180 | 250 | 0.7 | 39 | 0.3 | 450 | 86 |
| | 8 | 1 | 490 | | | 100 | 80 | 300 | 1 | 80 | 120 | 0.7 | 103 | 0.8 | 450 | 86 |
| | 9 | 5 | 315 | | | 100 | 80 | 100 | 2 | 180 | 260 | 0.7 | 26 | 0.3 | 450 | 82 |
| | 10 | 5 | 315 | | | 100 | 80 | 120 | 2 | 150 | 220 | 0.7 | 30 | 0.3 | 450 | 82 |
| | 11 | 6 | 390 | | | 100 | 80 | 300 | 0 | 80 | 120 | 0.7 | 110 | 0.7 | 450 | 86 |
| | 12 | 6 | 390 | | | 100 | 80 | 300 | 0 | 80 | 120 | 0.7 | 115 | 0.7 | 450 | 86 |
| | 13 | 7 | 390 | | | 100 | 80 | 300 | 2 | 80 | 120 | 0.7 | 30 | 0.8 | 450 | 82 |
| | 14 | 8 | 390 | | | 100 | 80 | 300 | 2 | 80 | 120 | 0.7 | 44 | 0.8 | 450 | 82 |
| | 15 | 9 | 390 | | | 100 | 80 | 150 | 1 | 120 | 170 | 0.7 | 100 | 0.5 | 450 | 86 |
| | 16 | 10 | 390 | | | 100 | 80 | 150 | 1 | 120 | 170 | 0.7 | 105 | 0.5 | 450 | 86 |
| | 17 | 11 | 390 | | | 100 | 80 | 150 | 1 | 120 | 170 | 0.7 | 65 | 0.5 | 450 | 82 |
| | 18 | 12 | 390 | | | 100 | 80 | 150 | 1 | 120 | 170 | 0.7 | 50 | 0.5 | 450 | 82 |
| | 19 | 13 | 390 | | | 100 | 80 | 150 | 1 | 120 | 170 | 0.7 | 35 | 0.5 | 450 | 86 |
| | 20 | 14 | 390 | | | 100 | 80 | 150 | 1 | 120 | 170 | 0.7 | 35 | 0.5 | 450 | 86 |
| | 21 | 1 | 390 | | | | 80 | 150 | 1 | 120 | 170 | 0.7 | 65 | 0.5 | 0 | 86 |
| | 22 | 1 | 390 | | | 10 | 80 | 150 | 1 | 120 | 170 | 0.7 | 65 | 0.5 | 50 | 86 |
| | 23 | 1 | 390 | | | 20 | 80 | 150 | 1 | 120 | 170 | 0.7 | 65 | 0.5 | 100 | 86 |
| | 24 | 1 | 390 | | | 200 | 80 | 150 | 1 | 120 | 170 | 0.7 | 65 | 0.5 | 1000 | 86 |
| | 25 | 1 | 390 | | | 220 | 80 | 150 | 1 | 120 | 170 | 0.7 | 65 | 0.5 | 1100 | 86 |
| | 26 | 1 | 390 | | | 100 | 80 | 500 | 1 | 45 | 70 | 0.6 | 65 | 0.5 | 450 | 86 |
| | 27 | 1 | 390 | | | 100 | 80 | 450 | 1 | 50 | 80 | 0.6 | 65 | 0.5 | 450 | 86 |
| | 28 | 1 | 210 | | | 100 | 80 | 100 | 1 | 200 | 300 | 0.7 | 65 | 0.5 | 450 | 86 |
| | 29 | 1 | 210 | | | 100 | 60 | 100 | 1 | 250 | 400 | 0.6 | 65 | 0.5 | 450 | 86 |
| | 30 | 1 | 630 | | | 100 | 80 | 150 | 0 | 120 | 220 | 0.5 | 70 | 0.6 | 450 | 86 |
| | 31 | 1 | 630 | | | 100 | 80 | 150 | 1 | 120 | 200 | 0.6 | 65 | 0.5 | 450 | 86 |
| | 32 | 1 | 140 | | | 100 | 80 | 450 | 1 | 120 | 150 | 0.8 | 65 | 0.5 | 450 | 86 |
| | 33 | 15 | 390 | | | 100 | 80 | 150 | 1 | 120 | 170 | 0.7 | 65 | 0.5 | 450 | 35 |
| | 34 | 16 | 390 | | | 100 | 80 | 150 | 1 | 120 | 170 | 0.7 | 65 | 0.5 | 450 | 40 |
| | 35 | 17 | 390 | | | 100 | 80 | 150 | 1 | 120 | 170 | 0.7 | 65 | 0.5 | 450 | 107 |
| | 36 | 18 | 390 | | | 100 | 80 | 150 | — | — | — | — | — | — | 450 | 70 |
| | 37 | 1 | 315 | | | 100 | 70 | 110 | 1 | 180 | 250 | 0.7 | 31 | 0.2 | 450 | 86 |
| | 38 | 1 | 490 | | | 100 | 100 | 200 | 1 | 80 | 120 | 0.7 | 110 | 0.9 | 450 | 86 |

(Resin Particle 39)

In a four-necked flask equipped with a stirrer, a reflux condenser and a nitrogen gas introduction tube, 0.2 parts of potassium persulfate and 79.4 parts of ion exchange water were placed and nitrogen gas was introduced. In addition, 19.7 parts of butyl methacrylate, 0.4 parts of methacrylic acid and 0.3 parts of a reactive surfactant (trade name "AQUALON KH-05", manufactured by Dai-ichi Kogyo Seiyaku Co., Ltd.) were mixed to obtain a mixture. The obtained mixture was added dropwise to the four-necked flask for 1 hour with stirring and then reacted at 80° C. for 2 hours. The content was then cooled to 25° C. and potassium hydroxide and an appropriate amount of ion exchange water were added to adjust the pH of the liquid to 8.5. In this manner, a liquid containing the resin particle 39 having a resin particle content of 25.0% was obtained. (Resin Particle 40)

"Polyester PB-3" was synthesized according to the description of Production Example 4 of Japanese Patent Application Laid-Open No. 2017-226834. Specifically, 1,2-propanediol, ethylene glycol, trimethylolpropane, and isophthalic acid were used as raw materials, and an esterification catalyst and an esterification co-catalyst were used to carry out an esterification reaction at 210° C. for 10 hours in a nitrogen atmosphere. Then, the reaction was carried out under reduced pressure to obtain polyester PB-3. The acid value of polyester PB-3 was 8 mgKOH/g. 200 g of polyester PB-3 thus obtained and 200 g of methyl ethyl ketone were mixed and dissolved by stirring at 25° C. 3.4 g of a 5 mol/L sodium hydroxide aqueous solution was added and 457 g of ion exchange water was added under stirring. Then, the temperature was raised to 60° C. and methyl ethyl ketone was distilled off under reduced pressure. Then, the resultant was filtered through a 200-mesh wire mesh. Next, an appropriate amount of ion exchange water was added to adjust the content of the resin particle to obtain a liquid containing resin particle 40 having a resin particle content of 25.0%. The amount of carboxylic acid groups present on the particle surface of the resin particle 40 was 35 µmol/g, and the molar ratio of the carboxylic acid groups on the particle surface was 0.2 times.

<Preparation of Pigment Dispersion Liquid>

(Pigment Dispersion Liquid 1)

A mixture of 10.0 parts of a pigment, 20.0 parts of a liquid containing a resin and 70.0 parts of ion exchange water was placed in a batch-type vertical sand mill (manufactured by IMEX Co., Ltd.) filled with 200 parts of zirconia beads having a diameter of 0.3 mm and dispersed for 5 hours. As the pigment, C.I. Pigment Yellow 74 (trade name "Hansa yellow 5GX 01 LV 3344", manufactured by Clariant Co.) was used. As the liquid containing the resin, an aqueous solution in which the water-soluble resin was dissolved in water containing potassium hydroxide whose amount is equimolar to the acid value of the water soluble resin and the resin content was 30.0% was used. The water-soluble resin used at this case was an ethyl styrene-ethyl acrylate-acrylic acid copolymer having an acid value of 167 mgKOH/g and a weight average molecular weight of 10,000. Then, the resultant was centrifuged to remove coarse particles and pressure-filtered with a microfilter (manufactured by Fujifilm Corporation) having a pore diameter of 3.0 µm to obtain a pigment dispersion liquid 1. The pigment content in the pigment dispersion liquid 1 was 10.0% and the resin content was 6.0%.

(Pigment Dispersion Liquid 2)

5.0 g of concentrated hydrochloric acid was dissolved in 5.5 g of water, the solution was cooled to 5° C. and 1.6 g of 4-aminophthalic acid was added in this state. The container containing this solution was placed in an ice bath and the solution was maintained at a temperature of 10° C. or lower by being stirred. To this solution, a solution obtained by dissolving 1.8 g of sodium nitrite in 9.0 g of ion exchange water of 5° C. was added. The resulting solution was stirred for 15 minutes and 6.0 g of carbon black (trade name "NIPex 170IQ") was then added thereto with stirring, followed by further stirring for 15 minutes to obtain a slurry. The obtained slurry was filtered through a filter paper (trade name "STANDARD FILTER PAPER No. 2", manufactured by ADVANTECH) and the particles were thoroughly washed with water and dried in an oven at 110° C. Then, the counter ion was exchanged from a sodium ion to a potassium ion by an ion exchange method to obtain a self-dispersible pigment having a —$C_6H_3$—$(COOK)_2$ group bonded to the surface of the carbon black particles. The content of the pigment was adjusted by adding an appropriate amount of ion exchange water and thus a pigment dispersion liquid 2 having a pigment content of 10.0% was obtained.

<Preparation of Ink>

Each component shown below was mixed, sufficiently stirred and then pressure-filtered with a microfilter having a pore diameter of 2.5 µm to prepare an ink. "Acetyleneol E100" is a trade name of a nonionic surfactant manufactured by Kawaken Fine Chemicals Co., Ltd. Table 3 also shows the characteristics of the ink.

Coloring material (type shown in Table 3): amount used (%) shown in Table 3

Liquid containing the resin particle (type shown in Table 3): 24.0%

Glycerin: 5.0%

Triethylene glycol: 10.0%

Acetyleneol E100: 0.1%

Ion exchange water: remainder (%) that makes the total of the components 100.0%

<Evaluation>

In the present invention, in the evaluation criteria of the following respective evaluation items, "A" and "B" were taken as acceptable levels and "C" was taken as an unacceptable level. The evaluation results are shown in Table 3.

(Abrasion Resistance)

Each of the inks obtained above was filled in an ink cartridge and the ink cartridge was mounted on an ink jet recording apparatus (trade name "PIXUS iP3100", manufactured by Canon Inc.) that ejects the ink from a recording head by the action of thermal energy. In the examples, the recording duty of the solid image recorded under the condition that 5 pL of one ink droplet is applied to a unit area of 1/1200 inch×1/1200 inch is defined as 100%. Using the above-mentioned ink jet recording apparatus, a solid image of 200 mm×200 mm having a recording duty of 100% was recorded on a recording medium (trade name "AURORA COAT", manufactured by Nippon Paper Industries Co., Ltd.). After drying the image at 25° C. for 24 hours, the image was heated at 100° C. for 1 hour using a heating type oven. The obtained image was subjected to an abrasion test under the condition of 10 reciprocations with a load of 500 g using a Gakushin type tester (trade name "ABRASION RESISTANCE TESTER", manufactured by Imoto Machinery Co., Ltd.) that can perform measurement according to JIS L 0849. The image after the abrasion test was visually confirmed and the abrasion resistance was evaluated according to the following evaluation criteria.

A: There were no scratches on the image.

B: The image had scratches, but the recording medium was not visible.

C: The image had scratches and the recording medium was visible.

(Storage Stability)

The resin particle in the ink obtained above were appropriately taken out and the amount of carboxylic acid groups $V_1$ (µmol/g) on the particle surface was measured. In addition, each ink obtained above was placed in an airtight container made of polytetrafluoroethylene and stored at 60° C. for 2 weeks. The resin particle in the ink after storage were appropriately taken out and the amount of carboxylic acid groups $V_2$ (µmol/g) on the particle surface was measured. Then, the rate of change in the amount of carboxylic acid groups on the particle surface was calculated according to the formula of rate of change $P=V_2/V_1 \times 100(\%)$, and the storage stability was evaluated according to the following evaluation criteria. When the value of the rate of change is large, the dispersion state of the resin particle is unstable, and the ink thickens due to an increase in the particle diameter and the aggregation of the resin particle. Thus, this case means that the storage stability of the ink is low.

A: The rate of change was less than 3%.

B: The rate of change was 3% or more and less than 5%.

C: The rate of change was 5% or more.

TABLE 3

Composition and characteristics of ink and evaluation results

| | | Composition | | | Characteristics | | | | Evaluation results | |
|---|---|---|---|---|---|---|---|---|---|---|
| | | Coloring material | | | Content | | | | | |
| | | Type | Amount used (%) | Type of resin particle | Pigment P (%) | Resin particle R (%) | R/P value (times) | Viscosity (mPa·s) | Abrasion resistance | Storage stability |
| Example | 1 | Pigment dispersion liquid 1 | 34.0 | 1 | 3.4 | 6.0 | 1.8 | 2.1 | A | A |
| | 2 | Pigment dispersion liquid 2 | 34.0 | 1 | 3.4 | 6.0 | 1.8 | 2.1 | A | A |
| | 3 | Pigment dispersion liquid 1 | 34.0 | 2 | 3.4 | 6.0 | 1.8 | 2.1 | A | A |
| | 4 | Pigment dispersion liquid 1 | 34.0 | 3 | 3.4 | 6.0 | 1.8 | 2.1 | A | A |
| | 5 | Pigment dispersion liquid 1 | 34.0 | 4 | 3.4 | 6.0 | 1.8 | 2.1 | A | A |
| | 6 | Pigment dispersion liquid 1 | 34.0 | 5 | 3.4 | 6.0 | 1.8 | 2.1 | A | A |
| | 7 | Pigment dispersion liquid 1 | 34.0 | 6 | 3.4 | 6.0 | 1.8 | 2.1 | A | A |
| | 8 | Pigment dispersion liquid 1 | 34.0 | 7 | 3.4 | 6.0 | 1.8 | 2.1 | A | A |
| | 9 | Pigment dispersion liquid 1 | 34.0 | 8 | 3.4 | 6.0 | 1.8 | 2.1 | A | A |
| | 10 | Pigment dispersion liquid 1 | 34.0 | 9 | 3.4 | 6.0 | 1.8 | 2.1 | A | B |
| | 11 | Pigment dispersion liquid 1 | 34.0 | 10 | 3.4 | 6.0 | 1.8 | 2.1 | A | A |
| | 12 | Pigment dispersion liquid 1 | 34.0 | 11 | 3.4 | 6.0 | 1.8 | 2.1 | A | A |
| | 13 | Pigment dispersion liquid 1 | 34.0 | 12 | 3.4 | 6.0 | 1.8 | 2.1 | A | B |
| | 14 | Pigment dispersion liquid 1 | 34.0 | 13 | 3.4 | 6.0 | 1.8 | 2.1 | A | B |
| | 15 | Pigment dispersion liquid 1 | 34.0 | 14 | 3.4 | 6.0 | 1.8 | 2.1 | A | A |
| | 16 | Pigment dispersion liquid 1 | 34.0 | 15 | 3.4 | 6.0 | 1.8 | 2.1 | A | A |
| | 17 | Pigment dispersion liquid 1 | 34.0 | 16 | 3.4 | 6.0 | 1.8 | 2.1 | A | B |
| | 18 | Pigment dispersion liquid 1 | 34.0 | 17 | 3.4 | 6.0 | 1.8 | 2.1 | B | A |
| | 19 | Pigment dispersion liquid 1 | 34.0 | 18 | 3.4 | 6.0 | 1.8 | 2.1 | A | A |
| | 20 | Pigment dispersion liquid 1 | 34.0 | 19 | 3.4 | 6.0 | 1.8 | 2.1 | A | A |
| | 21 | Pigment dispersion liquid 1 | 34.0 | 20 | 3.4 | 6.0 | 1.8 | 2.1 | B | A |
| | 22 | Pigment dispersion liquid 1 | 34.0 | 21 | 3.4 | 6.0 | 1.8 | 2.1 | B | B |
| | 23 | Pigment dispersion liquid 1 | 34.0 | 22 | 3.4 | 6.0 | 1.8 | 2.1 | A | B |
| | 24 | Pigment dispersion liquid 1 | 34.0 | 23 | 3.4 | 6.0 | 1.8 | 2.1 | A | A |
| | 25 | Pigment dispersion liquid 1 | 34.0 | 24 | 3.4 | 6.0 | 1.8 | 2.1 | A | A |
| | 26 | Pigment dispersion liquid 1 | 34.0 | 25 | 3.4 | 6.0 | 1.8 | 2.1 | B | A |
| | 27 | Pigment dispersion liquid 1 | 34.0 | 26 | 3.4 | 6.0 | 1.8 | 2.1 | A | B |
| | 28 | Pigment dispersion liquid 1 | 34.0 | 27 | 3.4 | 6.0 | 1.8 | 2.1 | A | A |
| | 29 | Pigment dispersion liquid 1 | 34.0 | 28 | 3.4 | 6.0 | 1.8 | 2.1 | A | A |
| | 30 | Pigment dispersion liquid 1 | 34.0 | 29 | 3.4 | 6.0 | 1.8 | 2.1 | A | B |
| | 31 | Pigment dispersion liquid 1 | 34.0 | 30 | 3.4 | 6.0 | 1.8 | 2.1 | A | B |
| | 32 | Pigment dispersion liquid 1 | 34.0 | 31 | 3.4 | 6.0 | 1.8 | 2.1 | A | A |
| | 33 | Pigment dispersion liquid 1 | 34.0 | 32 | 3.4 | 6.0 | 1.8 | 2.1 | A | A |
| | 34 | Pigment dispersion liquid 1 | 34.0 | 33 | 3.4 | 6.0 | 1.8 | 2.1 | B | A |
| | 35 | Pigment dispersion liquid 1 | 34.0 | 34 | 3.4 | 6.0 | 1.8 | 2.1 | A | A |
| | 36 | Pigment dispersion liquid 1 | 34.0 | 35 | 3.4 | 6.0 | 1.8 | 2.1 | A | A |
| | 37 | — | — | 1 | 0.0 | 6.0 | — | 2.1 | B | A |
| | 38 | C.I. Direct Blue 199 | 3.4 | 1 | 0.0 | 6.0 | — | 2.1 | B | A |
| Comparative Example | 1 | Pigment dispersion liquid 1 | 34.0 | — | 3.4 | 0.0 | 0.0 | 2.0 | C | A |
| | 2 | Pigment dispersion liquid 1 | 34.0 | 39 | 3.4 | 6.0 | 1.8 | 2.1 | C | A |
| | 3 | Pigment dispersion liquid 1 | 34.0 | 36 | 3.4 | 6.0 | 1.8 | — | — | — |
| | 4 | Pigment dispersion liquid 1 | 34.0 | 37 | 3.4 | 6.0 | 1.8 | 2.1 | A | C |
| | 5 | Pigment dispersion liquid 1 | 34.0 | 38 | 3.4 | 6.0 | 1.8 | 2.1 | A | C |
| | 6 | Pigment dispersion liquid 1 | 34.0 | 40 | 3.4 | 6.0 | 1.8 | 2.1 | A | C |

According to the present invention, it is possible to provide an aqueous ink having excellent storage stability and capable of recording an image having excellent abrasion resistance, and a method for preparing the aqueous ink. In addition, according to another exemplary embodiment of the present invention, it is possible to provide an ink cartridge using the aqueous ink and an ink jet recording method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An aqueous ink for ink jet comprising a resin particle, wherein the resin particle is formed of a polyester resin having a carboxylic acid group,
   an amount of carboxylic acid groups present on a particle surface of the resin particle is 0.3 times or more to 0.8 times or less in terms of molar ratio with respect to all of the carboxylic acid groups of the polyester resin having a carboxylic acid group, and
   the resin particle comprises a compound represented by Formula (1), in Formula (1), $R_1$, $R_2$ and $R_3$ each independently represent a hydrogen atom or an alkyl group having 1 to 4 carbon atoms.

2. The aqueous ink according to claim 1, wherein an amount of carboxylic acid groups present on the particle surface of the resin particle is 30 µmol/g or more to 110 µmol/g or less.

3. The aqueous ink according to claim 1, wherein an acid value corresponding to all of the carboxylic acid groups of the polyester resin is 3 mgKOH/g or more to 11 mgKOH/g or less.

4. The aqueous ink according to claim 1, wherein the polyester resin has a weight average molecular weight of 15,000 or more to 70,000 or less.

5. The aqueous ink according to claim 1, wherein a proportion (ppm) of the compound represented by the Formula (1) in the resin particle is 100 ppm or more to 1,000 ppm or less based on a total mass of the resin particle.

6. The aqueous ink according to claim 1, wherein a volume-based cumulative 50% particle diameter of the resin particle is 50 nm or more to 200 nm or less.

7. The aqueous ink according to claim 1, wherein a ratio (times) of a volume-based cumulative 50% particle diameter of the resin particle with respect to a volume-based cumulative 90% particle diameter of the resin particle is 0.6 times or more.

8. An ink cartridge comprising:
an ink; and
an ink storage portion that stores the ink,
wherein the ink comprises the aqueous ink according to claim 1.

9. An ink jet recording method comprising:
ejecting an ink from an ink jet recording head to record an image on a recording medium,
wherein the ink comprises the aqueous ink according to claim 1.

10. A method for producing an aqueous ink for ink jet containing a resin particle, the method comprising:
producing a resin particle; and
mixing the resin particle obtained in the producing of the resin particle with other ink components to produce an aqueous ink,
wherein the producing of the resin particle has
(1) reacting a polycarboxylic acid with a polyhydric alcohol to synthesize a polyester resin having a carboxylic acid group, and
(2) dissolving both the polyester resin having a carboxylic acid group and a compound represented by Formula (1) in an organic solvent and then subjecting the solution to phase inversion to an aqueous phase in the presence of a base, thereby obtaining the resin particle comprising the compound represented by Formula (1) and in which an amount of carboxylic acid groups present on a particle surface of the resin particle is adjusted to 0.3 times or more to 0.8 times or less in terms of molar ratio with respect to all of the carboxylic acid groups of the polyester resin having a carboxylic acid group, in Formula (1), $R_1$, $R_2$ and $R_3$ each independently represent a hydrogen atom or an alkyl group having 1 to 4 carbon atoms.

11. The aqueous ink according to claim 1, wherein the content (% by mass) of the resin particle in the ink is 0.1% by mass or more to 15.0% by mass or less based on the total mass of the ink.

12. The aqueous ink according to claim 1, wherein the content (% by mass) of the resin particle in the ink is 1.0% by mass or more to 10.0% by mass or less based on the total mass of the ink.

13. The aqueous ink according to claim 1, wherein the polyester resin further comprises a unit having an aromatic group.

14. The aqueous ink according to claim 13, wherein the proportion (% by mass) of the unit having an aromatic group in the polyester resin is 25% by mass or more to 50% by mass or less based on the total mass of the resin.

15. The aqueous ink according to claim 1, wherein the glass transition temperature of the resin particle formed of the polyester resin is 40° C. or higher.

16. The aqueous ink according to claim 1, wherein a volume-based cumulative 90% particle diameter of the resin particle is 70 nm or more to 280 nm or less.

17. The aqueous ink according to claim 1, wherein the proportion (% by mass) of the polyester resin in the resin forming the resin particle is 90% by mass or more based on the total mass of the resin.

* * * * *